US010867295B2

(12) United States Patent
Shayovitz

(10) Patent No.: US 10,867,295 B2
(45) Date of Patent: Dec. 15, 2020

(54) QUEUING SYSTEM

(71) Applicant: SKIP HOLDINGS, LLC, Albuquerque, NM (US)

(72) Inventor: Gideon Shayovitz, Tel Aviv (IL)

(*) Notice: Subject to any disclaimer, the term of this patent is extended or adjusted under 35 U.S.C. 154(b) by 67 days.

(21) Appl. No.: 16/115,651

(22) Filed: Aug. 29, 2018

(65) Prior Publication Data
US 2019/0066087 A1 Feb. 28, 2019

Related U.S. Application Data

(63) Continuation of application No. 62/551,326, filed on Aug. 29, 2017.

(51) Int. Cl.
*G06Q 20/32* (2012.01)
*G06Q 20/20* (2012.01)
*H04W 40/24* (2009.01)
*H04W 4/021* (2018.01)
*G06Q 30/06* (2012.01)
*G06Q 10/06* (2012.01)
*H04W 4/20* (2018.01)
*H04W 4/80* (2018.01)
*H04W 4/029* (2018.01)
*G06F 16/23* (2019.01)

(52) U.S. Cl.
CPC ......... *G06Q 20/3224* (2013.01); *G06Q 10/06* (2013.01); *G06Q 20/20* (2013.01); *G06Q 20/202* (2013.01); *G06Q 30/06* (2013.01); *H04W 4/021* (2013.01); *H04W 4/20* (2013.01); *H04W 4/80* (2018.02); *H04W 40/244* (2013.01); *G06F 16/2379* (2019.01); *H04W 4/029* (2018.02)

(58) Field of Classification Search
CPC ........ G06Q 20/32; G06Q 20/38; G06Q 10/02; G06Q 20/12; G06F 3/0484; H04L 29/08; G06N 5/04; H04W 4/00
USPC ...................................... 705/39, 21
See application file for complete search history.

(56) References Cited

U.S. PATENT DOCUMENTS

| | | | |
|---|---|---|---|
| 9,456,309 B2 * | 9/2016 | Zises ................... H04W 4/029 |
| 10,127,542 B2 * | 11/2018 | Syed .................... G06Q 20/327 |
| 10,185,921 B1 * | 1/2019 | Heller .................... G07C 9/27 |
| 10,318,968 B2 * | 6/2019 | Tineo ................. G06Q 30/0201 |
| 10,332,140 B2 * | 6/2019 | He ..................... G06Q 30/0207 |
| 10,332,168 B2 * | 6/2019 | He ..................... G06Q 30/0611 |
| 10,417,690 B2 * | 9/2019 | Mueller .............. G06Q 30/016 |
| 10,460,324 B1 * | 10/2019 | Westen ................. G06Q 20/20 |

(Continued)

*Primary Examiner* — Oluseye Iwarere
(74) *Attorney, Agent, or Firm* — Ortiz & Lopez, PLLC; Luis M. Ortiz; Kermit D. Lopez

(57) ABSTRACT

System and method for interactive queue management are disclosed. A system can include a server in communication with at least one queue and can communicate with a user via his or her smartphone to provide the user with queue data from the beacon, determine the location of the smartphone relative to the queue via GPS or a wireless beacon, and pre-book the POS checkout of the user of the smartphone at the at least one queue. The system can be configured to allow the smartphone user to not have to maintain a view of the at least one queue or its progress in processing customers. The system can enable a user of the smartphone to dwell a minimum time at the at least one queue upon notification from the beacon to the smartphone of an advanced position/reservation at the queue to complete the customer's transaction.

15 Claims, 11 Drawing Sheets

(56) References Cited

U.S. PATENT DOCUMENTS

| | | | |
|---|---|---|---|
| 10,499,224 B2* | 12/2019 | Griffin | H04L 67/18 |
| 2011/0270712 A1* | 11/2011 | Wood | G01C 21/20 |
| | | | 705/27.1 |
| 2012/0173348 A1* | 7/2012 | Yoo | G06Q 20/10 |
| | | | 705/16 |
| 2013/0238455 A1* | 9/2013 | Laracey | G06Q 20/108 |
| | | | 705/21 |
| 2014/0074743 A1* | 3/2014 | Rademaker | G06Q 10/083 |
| | | | 705/334 |
| 2015/0073980 A1* | 3/2015 | Griffin | H04W 12/04031 |
| | | | 705/39 |
| 2015/0153935 A1* | 6/2015 | Underwood, IV | H04L 67/32 |
| | | | 715/738 |
| 2015/0186871 A1* | 7/2015 | Laracey | G06Q 20/3278 |
| | | | 705/41 |
| 2015/0186874 A1* | 7/2015 | Govindarajan | G06Q 20/382 |
| | | | 705/65 |
| 2015/0310417 A1* | 10/2015 | Syed | G06Q 20/327 |
| | | | 705/39 |
| 2016/0042367 A1* | 2/2016 | Vastbinder, Jr. | G06Q 30/0201 |
| | | | 705/7.29 |
| 2016/0080903 A1* | 3/2016 | Senturia | G06Q 30/0251 |
| | | | 455/456.3 |
| 2016/0155166 A1* | 6/2016 | He | G06Q 30/0611 |
| | | | 705/80 |
| 2016/0192149 A1* | 6/2016 | Zises | H04W 4/029 |
| | | | 455/456.3 |
| 2016/0203522 A1* | 7/2016 | Shiffert | G06Q 30/0267 |
| | | | 705/14.58 |
| 2016/0244311 A1* | 8/2016 | Burks | G06Q 30/0635 |
| 2016/0247113 A1* | 8/2016 | Rademaker | G06Q 10/063114 |
| 2016/0283925 A1* | 9/2016 | Lavu | G06Q 30/0222 |
| 2016/0321548 A1* | 11/2016 | Ziskind | G06Q 7/005 |
| 2016/0371673 A1* | 12/2016 | Eramian | G06Q 20/204 |
| 2017/0011449 A1* | 1/2017 | Mueller | G06Q 30/0635 |
| 2017/0116589 A1* | 4/2017 | Krishnaiah | G06Q 20/202 |
| 2017/0124511 A1* | 5/2017 | Mueller | G06Q 10/0837 |
| 2017/0161728 A1* | 6/2017 | Satyanarayan | G06Q 20/42 |
| 2017/0200152 A1* | 7/2017 | Winkler | G06Q 20/204 |
| 2017/0351982 A1* | 12/2017 | Tineo | G06Q 10/0631 |
| 2017/0352042 A1* | 12/2017 | Tineo | G06Q 30/0201 |
| 2017/0352043 A1* | 12/2017 | Tineo | G06Q 30/0201 |
| 2018/0005217 A1* | 1/2018 | Granbery | G06Q 20/20 |
| 2018/0216946 A1* | 8/2018 | Gueye | G01C 21/3492 |
| 2018/0247307 A1* | 8/2018 | Zucker | G06Q 20/202 |
| 2018/0260792 A1* | 9/2018 | Leclercq | G06Q 10/1097 |
| 2018/0260808 A1* | 9/2018 | Calderone | G06Q 20/3224 |
| 2018/0260849 A1* | 9/2018 | Leclercq | G06Q 30/0261 |
| 2018/0260863 A1* | 9/2018 | Leclercq | G06Q 30/0613 |
| 2018/0260864 A1* | 9/2018 | Leclercq | G06Q 30/0613 |
| 2018/0352378 A1* | 12/2018 | Sahadi | G06Q 50/14 |
| 2019/0066087 A1* | 2/2019 | Shayovitz | G06Q 20/202 |
| 2019/0188676 A1* | 6/2019 | Syed | G06Q 20/327 |
| 2019/0279200 A1* | 9/2019 | Govindarajan | G06Q 20/20 |
| 2019/0332785 A1* | 10/2019 | AthuluruTlrumala | G06Q 30/02 |

* cited by examiner

User behavior data base analysis

| User ID | Time 00:00 | Unique user duration calendrical data base | | | | | | | # of items I |
|---|---|---|---|---|---|---|---|---|---|
| Day | Year | Sunday | Monday | Tuesday | Wednesday | Thursday | Friday | Saturday | special event E |
| Month | First week | Duration, I, E | | | | | | | |
| | Second week | | | | | | | | (Holiday Sale) |
| | Third week | | | | | | | | |
| | Fourth week | | | | | | | | |

FIG. 5

Virtual line timeline $userID = T \begin{cases} + A. 04m:13s \\ + B. 01m:15s \end{cases}$   $userID = T \begin{cases} + A. 05m:09s \\ + B. 01m:28s \end{cases}$   $userID = T \begin{cases} + A. \text{Forecasted duration time at POS} \\ + B. \text{Forecasted travel time to POS} \end{cases}$ (1st Turn unit)          (2nd Turn unit)          (3rd Turn unit)

FIG. 6

QUEUING SYSTEM

INVENTION PRIORITY

The present embodiments claim the filing priority benefit as a Continuation of Provisional Application No. 62/551,326, filed Aug. 29, 2017, entitled "QUEUING SYSTEM", which is incorporated herein by reference in its entirety for it teaching.

FIELD OF THE INVENTION

The present invention relates to systems and methods for arranging queues. More particularly, the present invention related to systems and methods for arranging queues of humans in retail, grocery and service venue settings.

BACKGROUND OF THE INVENTION

American shoppers spend roughly 37 billions hours each year standing in lines such as, for example, checkout-lines. The waiting exacts an emotional toll: stress, aggression and increasing frustration as one' time slips away. Uncertainty amplifies all those elements. Anger and frustration is not the experience that service-providers want to be giving their customers; nevertheless, waiting in line remains a major complaint. In fact, frustration at lines causes a heavy hidden damage to the service providers. For example, 10% of potential customers abandon a cart and exit a store without buying anything, basically leaving a line because it is too long. Nearly half of all users will actively avoid a retailer or brand in the future if the wait in line was longer than five minutes, and "drive-by" and "skip" occurs when users do not enter a service provider because the lines are too long or are perceived to be too long.

The present inventor believes that feedback in the form of the expected wait, and access to a system that allows the user autonomy over his/her time and improved user mobility can significantly reduce user frustration. Other features may be provided in order to further supplement and improve the users' experience.

Previous attempts to optimize queuing, by adding communications hardware to elements such as shopping carts for users in shop queues, for example, failed to gain popularity due to the effort required to upgrade existing queuing systems and to maintain the upgraded systems.

Ideally, the present inventor believes that a user of a queue would be able to reserve a place in a queue and be free to roam about a store until finished with activities, and subsequently have minimum time waiting in a queue. In order to optimize queuing, it is imperative to determine the location of a user relative to the location of the queues. Solutions to this problem are not commercially available or could require extensive changes to the available systems.

It is an object of the embodiments is to provide an effective and easy upgrade to commercially available queuing systems. Further objects and advantages will become apparent from the foregoing description.

SUMMARY OF THE INVENTION

System and methods are presented for gathering and analyzing data on a managing server by monitoring points of sale software activity and monitoring beacon indications from their layout within a shopping location, saving and processing the data in order to forecast by any of date, event, duration, context, statistics, patterns, location and distances the time value of users in a virtual line.

According to an aspect of the embodiments, interactive queue management systems provide in accordance with the embodiments described herein can include a server in communication with at least one queue and can communicate with a user via his or her smartphone to provide the user with queue data from the beacon, determine the location of the smartphone relative to the queue, and pre-book the POS checkout of the user of the smartphone at the at least one queue. The system can also be configured to allow the smartphone user to not have to maintain a view of the at least one queue or its progress in processing customers. The system can enable a user of the smartphone to dwell a minimum time at the at least one queue upon wireless notification from the server to the smartphone of an advanced position/reservation at the queue to complete the customer's transaction.

According to another aspect of the embodiments, an interactive queue management system can be provided that includes a wireless beacon, a server in communication with at least one queue via the at least one wireless beacon, and can communicate with a user via his or her smartphone to provide the user with queue data from the beacon, determine the location of the smartphone relative to the queue, and pre-book the POS checkout of the user of the smartphone at the at least one queue.

In accordance with features of a method for interactive queue management, a system can be provided that can communicate with a user via his or her smartphone to provide the user with queue data from the server (e.g., wireless via the beacon), determine the location of the smartphone relative to the queue, and pre-book the POS checkout of the user of the smartphone at the at least one queue.

In accordance with another feature of the embodiment, a systems can be configured to allow the smartphone user to not have to maintain a view of the at least one queue or its progress in processing customers and can enable a user of the smartphone to dwell a minimum time at the at least one queue upon wireless notification from the server (e.g., via the beacon) to the smartphone of an advanced position/reservation at the queue to complete the customer's transaction.

According to another embodiment and aspects, a system does not have to include the use of beacons and a device such as the user's smartphone, which can be a GPS-enabled device, can determine the location of the user. GPS-enabled devices can serve to help determine location, particularly outdoors, and thus be useful for management of outdoor queues.

According to another embodiment, a system can be provided that can evaluate the distance between the user and the POS (point of service/sale), and the time it would take the user to arrive at the POS. The system, accordingly, can send a message to the smartphone at a notification time just prior to a checkout time that would allow the user to arrive at the queue and receive immediate service.

BRIEF DESCRIPTION OF THE DRAWINGS

Embodiments are herein described by way of example only, with reference to the accompanying drawings. With specific reference to the drawings, it is stressed that the particulars shown are by way of example and for purposes of illustrative discussion of the preferred embodiments, and are presented in the cause of providing what is believed to be the most useful and readily understood description of the principles and conceptual aspects of the embodiments. In this regard, no attempt is made to show structural details in more detail than is necessary for a fundamental understanding of the invention, the description taken with the drawings making apparent to those skilled in the art how the several forms of the invention can be embodied in practice without intending to limit the same.

FIG. 5 illustrates a chart wherein user behavior can be recorded and is further a diagram illustrating the unique user duration calenderic data base that can include, but not be limited to, exponential smoothing, box-Jenkins and other statistical forecasting functions implemented by a machine learning methodology, in accordance with features of the embodiments;

FIG. 6 illustrates a diagram representing the method for virtual line turn ordering, line processing time quantification structure and the time values in it, structuring a virtual line with time values regarded to each user and backlogged according to the line's turn booking order, in accordance with features of the embodiments;

DETAILED DESCRIPTION

Figure 1:
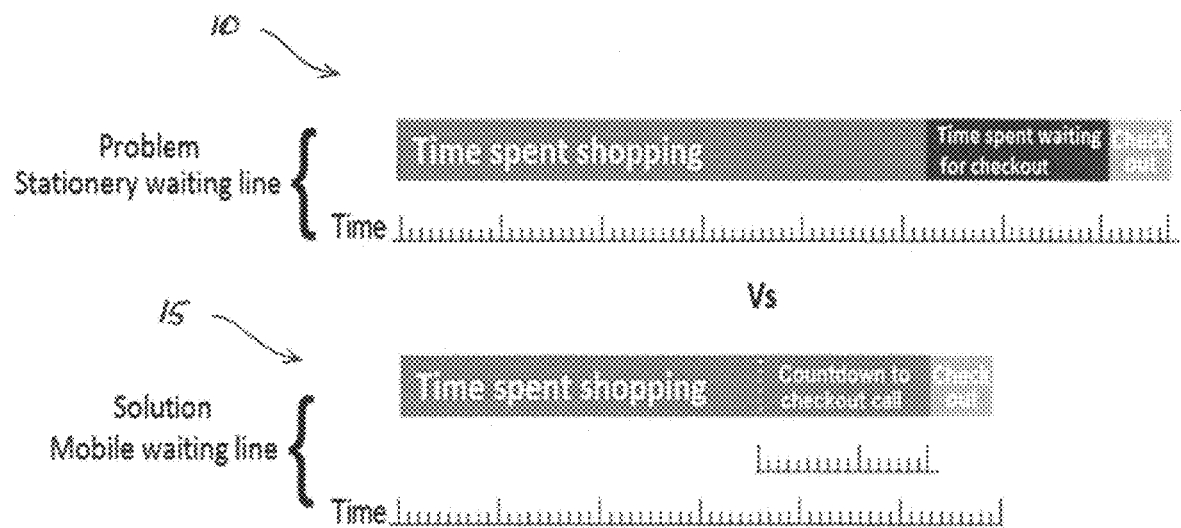
FIG. 1 illustrates a graph depicting the problem of a stationary waiting line when compared to the benefits of a mobile waiting line, in accordance with features of the embodiments.

Unless otherwise defined, all technical and scientific terms used herein have the same meaning as commonly understood by one of ordinary skill in the art to which this invention relates. Although methods and materials similar or equivalent to those described herein can be used in the practice or testing of the present invention, suitable methods and materials are described below. In case of conflict, the specification, including definitions, will control. In addition, the materials, methods, and examples are illustrative only and not intended to be limiting.

"POS" can refer to Point of Sale and Point of Service. As a rule, sale is considered herein below as merely a type of service, and thus any discussion regarding sale or selling should be interpreted broadly for the purpose of claiming the invention, and in the broad context of systems and methods including efficient arranging of items into queues.

Before explaining at least one embodiment in detail, it should be understood that the invention is not limited in its application to the details of construction and the arrangement of the components set forth in the following description or illustrated in the drawings. The invention is capable of other embodiments or of being practiced or carried out in various ways given the evolution of technology. In addition, it is to be understood that the phraseology and terminology employed herein is for the purpose of description and should not be regarded as limiting.

The systems and methods described below address alleviating a user's checkout line pain, by liberating line waiting as a physical constraint by providing timing flexibility and mobility. In other words, the systems and methods allow concomitantly getting in line in advance and the ability of being somewhere else in the meantime (e.g., while waiting for service at the POS/cash register). Referring to FIG. 1, illustrated is a graph depicting the problem of a stationary waiting line when compared to the benefits of a mobile waiting line, in accordance with features of the embodiments. As shown in the first timing diagram 10, the problem is illustrated where a customer will spend time shopping, spend time waiting in line, and then check out at a POS (e.g., cash register). Time waiting in line, which is the problem, can be avoided given the embodiments. As shown in the second timing diagram 15, the solution is illustrated where a customer will spend time shopping while concurrently holding a reservation to be processed at the POS and waiting to be notified of a reservation to be processed at the POS, and then is processed (e.g., checked out) at the POS. In the second timing diagram, the customer avoided waiting in line, which is a benefit to the customer.

Figure 2:
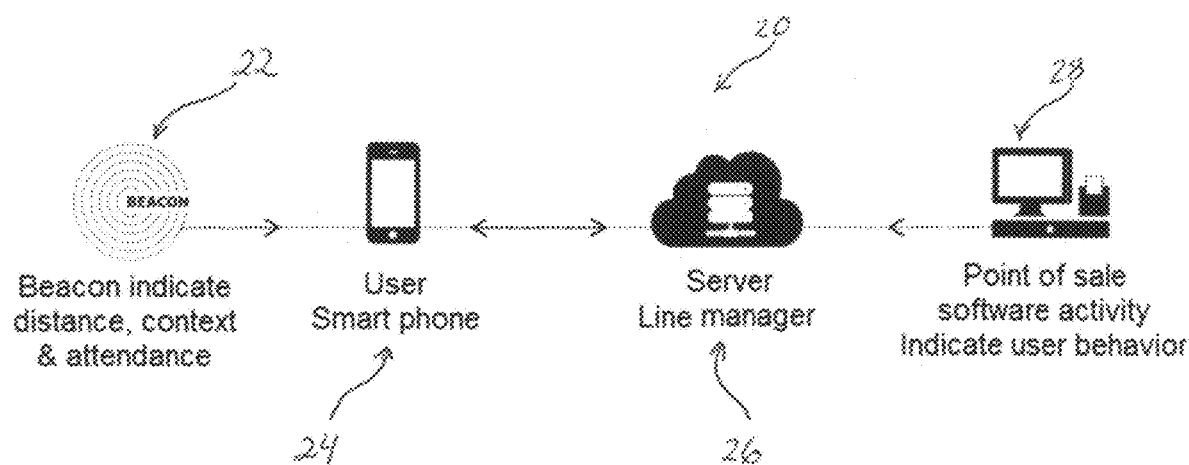
FIG. 2 illustrates a system diagram of components utilized to carry out features of the embodiments, e.g., to include communications between customer smartphones, beacons and points of service/sale (POS), in accordance with features of the embodiments.

Referring to FIG. 2, illustrated is a system diagram 20 of components utilized to carry out features of the embodiments, e.g., to include communications between customer smartphones 24, beacons 22 and points of service/sale (POS) 28, in accordance with features of the embodiments. FIG. 2 is a schematic depiction of exemplary components in such systems and methods, including at least one computerized, software operated POS device 28, capable of running a software component that monitors the POS's software activity on user line related behavior indicative data. The POS device 28 is interactive with a line- (and location-) managing server 26. Devices such as user smartphones 24 can be interactive with the server 26 and with beacons 22. The beacons 22 can be distributed throughout a retail location and serve as a positioning grid of low power signal transmitting computers such as estimate beacons, positioned at POS and in aisles areas. The beacons 22 can beam signals and enable proximity sensing of smartphones 24 and trigger activation of preprogrammed actions, e.g., via launch of indoor positioning technologies on the line-managing server 26.

Bridging the gap between user's smartphones 24 and points of service 28 opens a new channel of capabilities for management systems. According to one aspect, systems described below are provided, the systems can be configured to allow checking in mobile devices 24 entering a geofenced location, with a relevant location management server (LMS) 26. The LMS 26 recognizes a unique Point Of Service (POS) software activity, specifically associated with a certain checkout station 28, as an indication of vacancy identified with the checkout station's location number. The recognition enables the LMS 26 to manage a virtual line and let mobile users via their smartphones 24 to pre-book their checkout, while they are free to peruse (e.g., shop) the retail location and be informed about the line's progress and be updated on forecasted time estimates via their smartphones 24. As their turn comes up, a specific checkout station 28 is assigned for them. As the user's turn gets closer to the checkout time, a line status update alert is presented, triggering the user's time-limit mindset. The alert opens the time frame for an aisle based contextual notification that is targeted by an aisle beacon 22, such as the beacon transmitting a beam representing an aisle focused proximity offer to the device 24.

According to another aspect, a method is provided that comprises: shifting checkout lines' waiting time spend physically constrained, to waiting time spent unconstrained, while the line's order and timing is managed by a server 26 analyzing indications from POS software activity 28. In parallel POS activity is monitored such as items scanned and payment events. A layout of beacons 22 and interaction with the users smartphones 24 may enable to shift the checkout line waiting time frame ahead into the shopping period and eliminate line time by the introduction of mobility elements to a stationary medium.

Users are essentially able to book their checkout as soon as they enter the perimeter by utilizing their smartphones' mobility for the purpose of waiting line time frame allocation. Waiting lines are unbound from the stationary constraint of physical turn and position watching, and line entering is done only at the end of the shopping activity, to enable users to stroll the premises freely while at the same time to be in line and receive informing messages regarding their line position and time to check out.

Saving individual user data values may be performed for the purpose of forecasting user duration time at POS and optimizing the user's forecasted duration time at POS, forecasting live dynamic user travel time to point of sale from current location, recognizing user designated ID, and verifying attendance at POS. Systems and methods as described herein enable to manage the virtual line order, and coordinate and time the user's turn and forecasted time values, in addition to minimizing wait and vacancy at POS. The systems and methods can perform coordinating, comparing and overlapping the user's forecasted POS duration, travel time, attendance time and start of item's scan and payment with respect to timing a go checkout message to the next user in line. The systems and methods can consider travel time value to the designated point of sale in a way that the arrival moment at the assigned point of sale will be the closest to the payment moment of the prior user currently checking out, for the purpose of optimizing the continuous flow of users checking out. In addition, several alerts of line progress can be sent to the user based on the user's turn position in line, to provide sufficient early alerts as the line progresses prior to the final go checkout alert.

The system and method outlined above allow shifting the checkout line waiting time frame ahead into the perusal period, essentially enabling users to book their checkout as soon as they enter the venue. The line's constraint is unbound from physical position watching, entering the queue is entered only at the end of the perusal activity while at the same time being in line.

Referring to FIGS. 3A-3C, flow diagrams depict steps for monitoring and capturing point of sale software activity data. The data indicates item scans 32 and payment events 34 on a time line signature, while tagging the source with the station's location number 33, for the purpose of gathering user behavioral & contextual time related events data. The data can be saved and analyzed in various forecasting functions to determine attributes such as user duration at point of sale, item scan rate, and item processing time values as shown in block 35 (also see FIG. 5).

For example: Monitoring point of sale software's activity 32 running source code or/and Application Programming Interface, that represents users' checkout-line events; attaching a timeline signature to the monitored events indications to enable measuring duration time between events; marking the monitored events indications with defined event context, such as but not limited to user's first item scan & payment, and tagging the indications with the source POS station's locating number. These steps enable the system to know the user's checking out duration at a specific point of sale with the context of the users activity at a specific time. These data can then be collected for the purpose of learning the user's behavioral patterns and improve forecasting capabilities.

In an additional aspect, a specific time-signatured event can serve as a triggering indicator from the user's action at point of sale, as a first item scan indicates the beginning of checkout process and payment indicates the end of process. These indications serve as a user's turn processing start and end reference for the live progress of the virtual line, since the prioritization of designating a point of sale to a user is based on the current lowest duration load at points of sale and effects the system's triggered timing of progress alerts sent to the line's inhabitants with respect for keeping the continues checkout flow of users and determining the line's overall dynamic progress.

In addition, by cross referencing user ID attendance indication triggered by the point of sale attendance beacon, the indications and data captured ca be confirmed to be related to a specific identified user at a known point of sale station. The confirmation can enable the system to recognize the availability and dynamic remaining duration load state at each point of sale, referenced by each specific user at the point of sale, and its remaining processing time with respect to its expected forecasted duration time. The recognition in turn enables the allocation of next up users duration load at the least duration time loaded and most available point of sale at a given time.

In addition, capturing a user's POS duration time by monitoring the user's presence time at the point of sale attendance beacon, can serve as an additional or alternative indicator for an overall duration, and for indicating the time frame from the user's arrival to the POS to the user's first item scan as a time datum, that indicates the extent of continuity flow from checkout exiting user to checkout arriving user, essentially representing the waiting time of the arrived next user. For this duration, monitoring can serve as an additional optimization or as an alternative indicative source for the system.

Figure 4A:
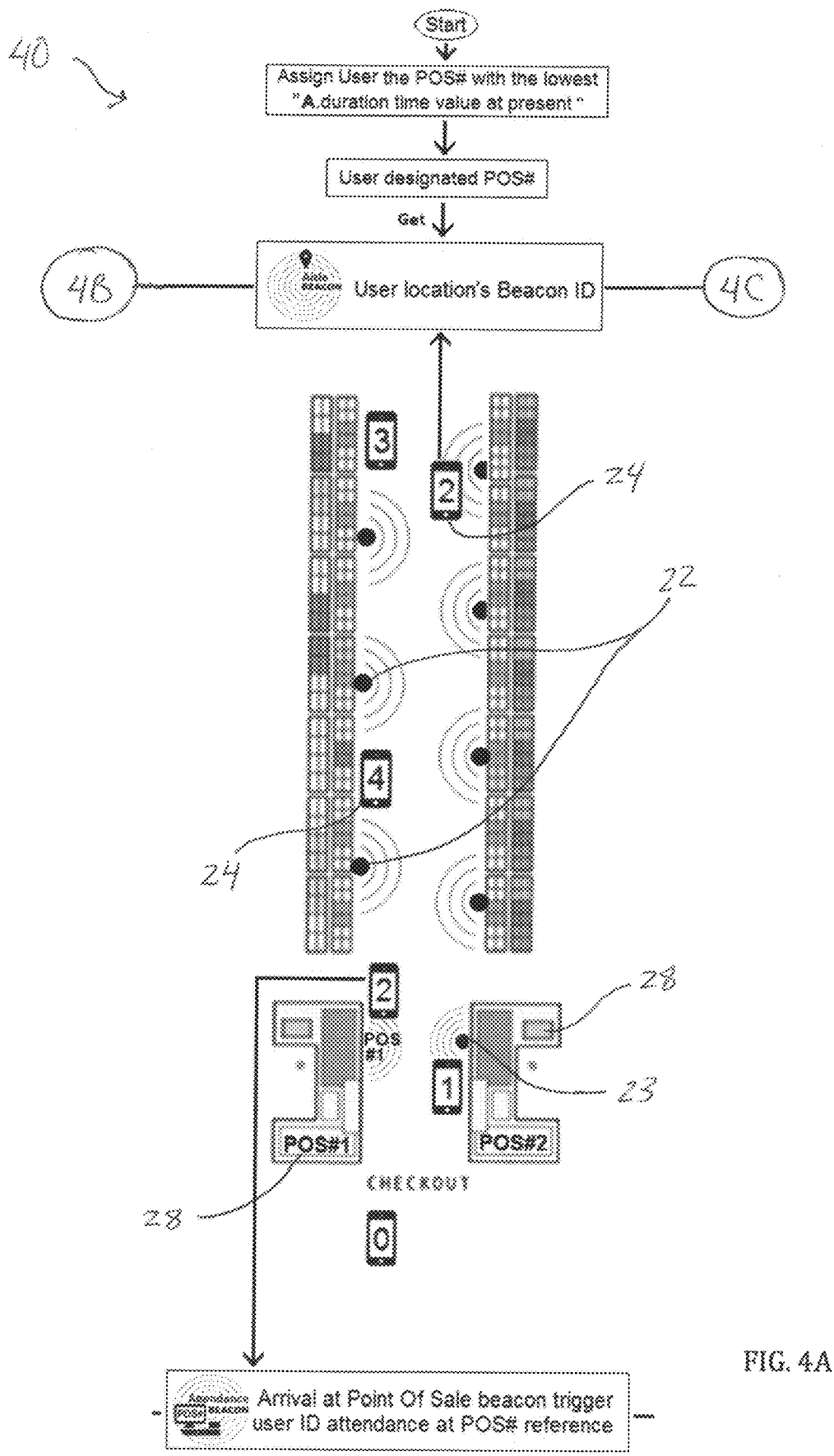
FIGS. 4A-4C depict flow diagrams illustrating wherein beacons laid out in a retail area can be utilized to monitor user smartphone location amongst isles in the retail area and can record travel time to and user attendance at a point of sale, in accordance with features of the embodiments.
Figure 4B:
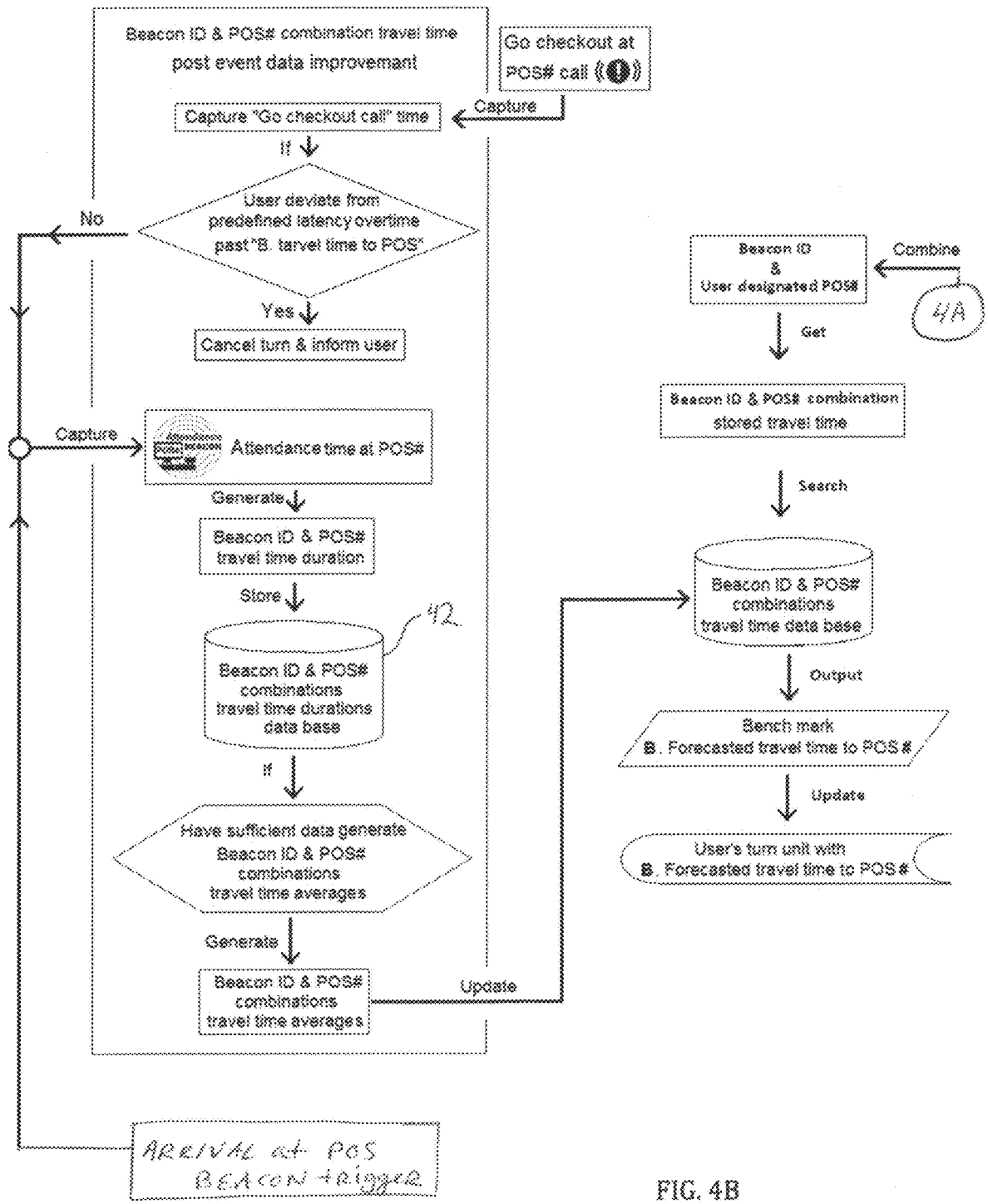
Figure 4C:
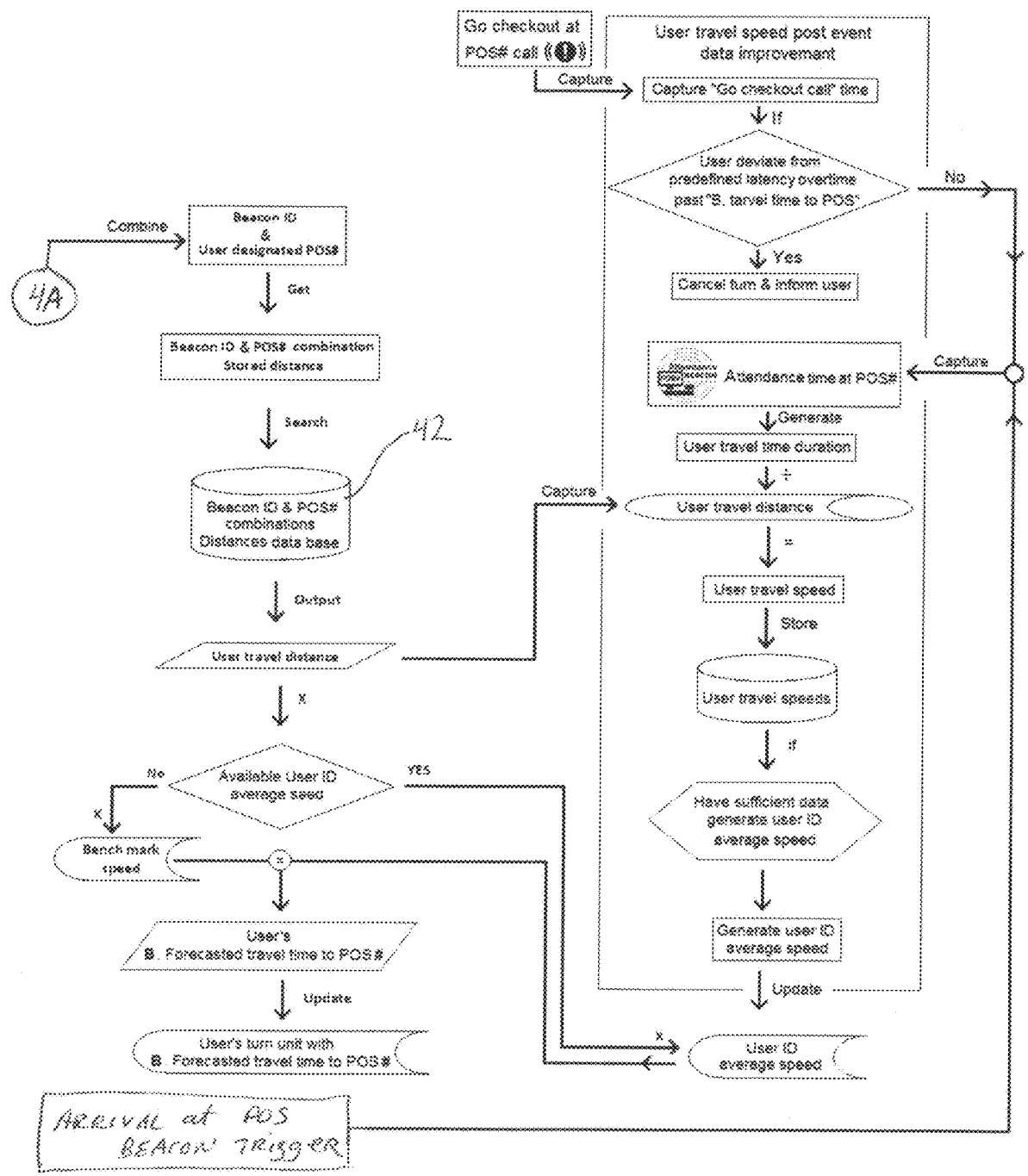

FIG. 4 illustrates a flow diagram 40 illustrating beacons 22 laid out in a retail area (e.g., within isles) can be utilized to monitor user smartphone 24 location amongst isles in the retail area and can record travel time to and user attendance at a point of sale 28, in accordance with features of the embodiments. Figure further presents a flow diagram illustrating a method of indicating a live and dynamic specific user travel time to point of sale and identifying specific user attendance at POS by a layout of beacons 22. A detected user's location beacon ID and user designated point of sale combination represents a pre-known inserted distance stored datum to be extracted from such unlimited inputted combinations database 42 of beacons 22 representing user's origin location and points of sale representing user's destination. The combinations of those origins & destinations serves as data for calculating and presenting the distances between the two combined points from the queried database 42. This extraction enables to generate the user's travel distance according the user's smartphone 24 proximate beacon 22 and designated point-of-sale combination 28, This distance output can then be multiplied by a travel benchmark speed to reach the user's forecasted travel time to its designated point-of-sale 28. Alternatively to the benchmark speed datum, the user's travel distance can be multiplied by the user's personal average speed, which is generated by the "user travel speed post event data improvement" process. This post event data improvement system collects a post event behavioral data on the user for the purpose of personalizing users travel time by implementing collected data as user travel duration from the time of "go checkout" message to the time of attendance at the designated point of sale attendance beacon.

Knowing user travel duration time data and the distance of the user's origin proximate beacon 22 to the designated point of sale 28 enables the system to generate a user's average travel speed datum that can be implemented to optimize the "B. forecasted travel time to POS #" by personalizing the user's speed. Furthermore, as the individual user's travel speeds data are stored in the database 42, the system can further optimize itself as data increases, by utilizing additional predicting statistical implementations similarly to the "unique user duration calendrical data base". Additionally, a retroactively captured data process represented as "Beacon ID & POS # combination travel time post event data Improvement" on the left of the diagram enables to generate a travel time duration related to the beacon 22 and point of sale 28 combination itself, and generate a combination based travel time average, that is driven from captured travel duration times from multiple users, for the objective of optimizing the combination's travel time average. The average may then be updated to the "beacon& POS # combinations travel time data base", that enables to generate a forecasted travel time to the designated point of sale based on optimizing the beacons & POS # combinations database from multiple user's collected travel duration times with the specific relevant origin and destination waypoints. These two methods, right side of diagram of user centered travel time optimization and left side of diagram of combination travel time optimization, can be used alternatively and or simultaneously for the overall purpose of optimizing the "B. forecasted travel time to POS #.

In addition the user ID attendance indication at point of sale 28 is generated by an attendance beacon 23 designated to each specific point of sale 28 for the purpose of triggering a user attendance reference at specific point of sale as the designated user arrives to its assigned point of sale. For example: the user can enter the point of sale approximate area covered by the attendance beacon 23, at that time the user's smart phone 24 will be triggered by a beacon 23 designated to be recognized as and represent a specific point of sale. This data with the user's ID is then sent via the user's smart phone 24 to the server 26, enabling the system to recognize the specific point of sale 28 and the specific attending user. Furthermore, the recognition enables the system to recognize the compatibility of both user and POS 28, if the two are assigned to each other, and to drive additional triggered processes as a result of the identified attendance indication of the user's arrival at its designated POS 28. Moreover, the recognition enables to correlate captured data at the POS 28 with an identified user.

FIG. 5 is a diagram 50 illustrating the unique user duration calenderic data base including but not limited to exponential smoothing, box-Jenkins and other statistical forecasting functions implemented by a machine learning methodology. In addition, the analysis of the captured data is implemented above merely as an example with respect to the human behavioral context of participating in a shopping activity, but can be adapted according to the activity. For example, comparing user's duration time at POS by days of the week and days of first week of the month, second week, third week and fourth week, in order to find a predictable pattern; considering users' paycheck time of the month influence, weekend and yearly holidays effects, or other event influences, that enables to extract a predication pattern regarding event at dates for a specific user.

In addition, in order to reach a sufficient forecast of duration time at POS when there is a lack of gathered data, or at a manually inputted "special event E" (see below regarding FIGS. 8 and 9), marked at a certain date, a request of number of items to checkout from the user will be triggered, being presented on the user interface, requesting the user to assess its number of items to be checked out. The system will consequently be capable of predicting user duration time at POS, by multiplying user's number of items to be checked out by average duration time per item datum, thereby enabling alternation between the combined two methods to reach optimality of forecast.

FIG. 6 depicts a diagram 60 representing the high level algorithm for determining virtual line turn ordering, line processing time quantification structure and the time values in it, structuring a virtual line with time values regarded to each user and backlogged according to the line's turn booking order.

Figure 7A:
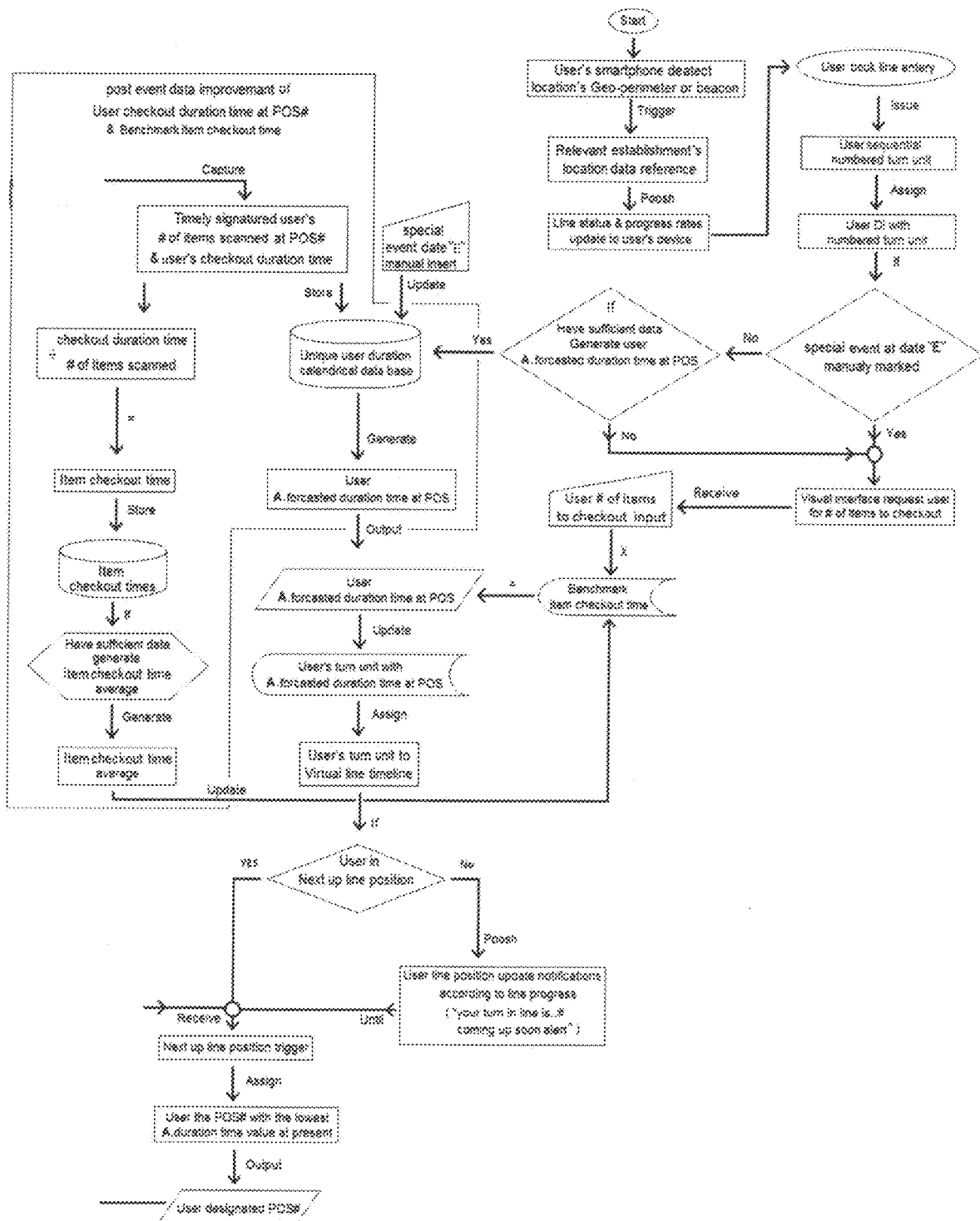
FIGS. 7A-7C depict flow diagrams illustrating the sequence of events triggered by the behavior of the users and received by the system's monitoring elements, in accordance with features of the embodiments.
Figure 7B:
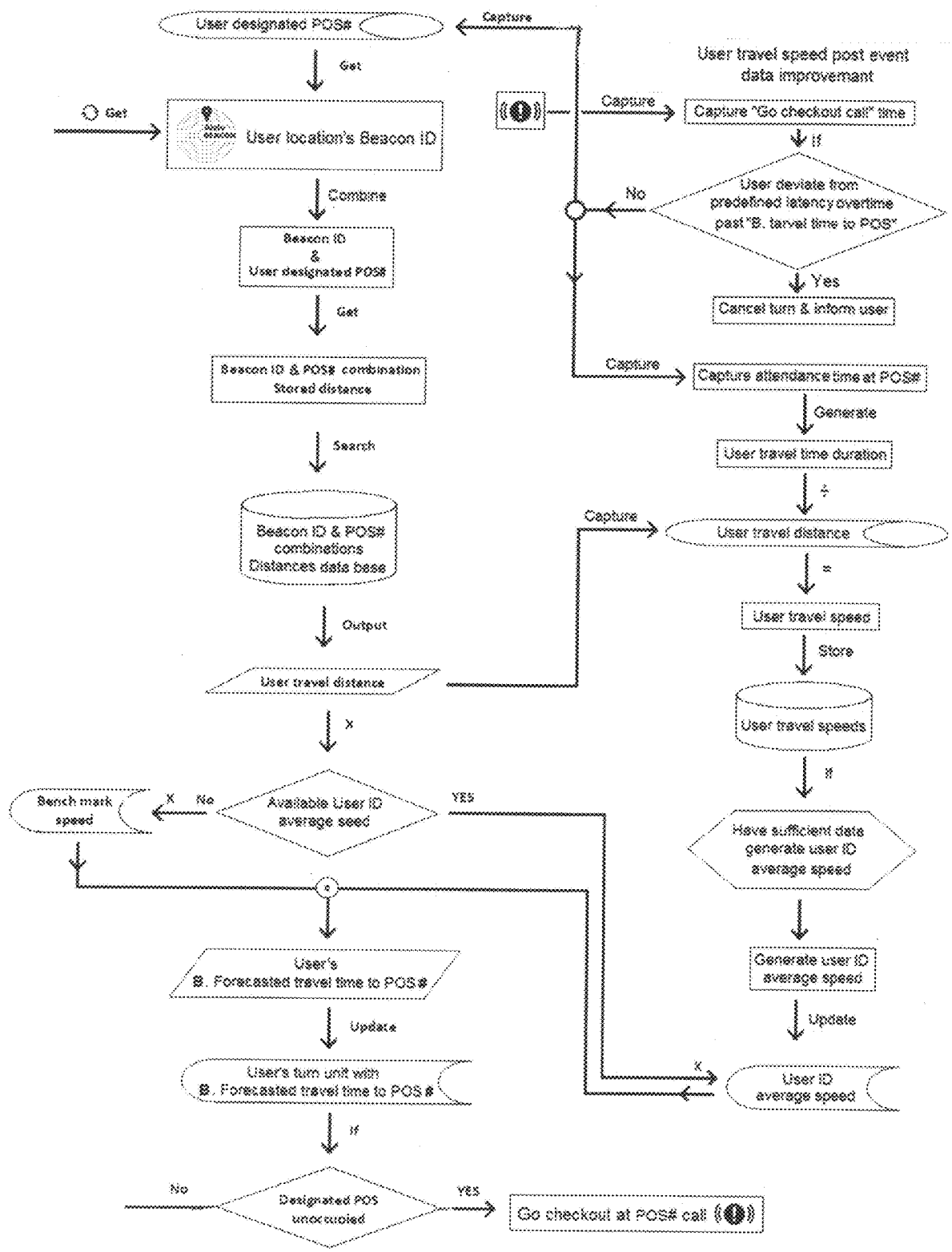
Figure 7C:
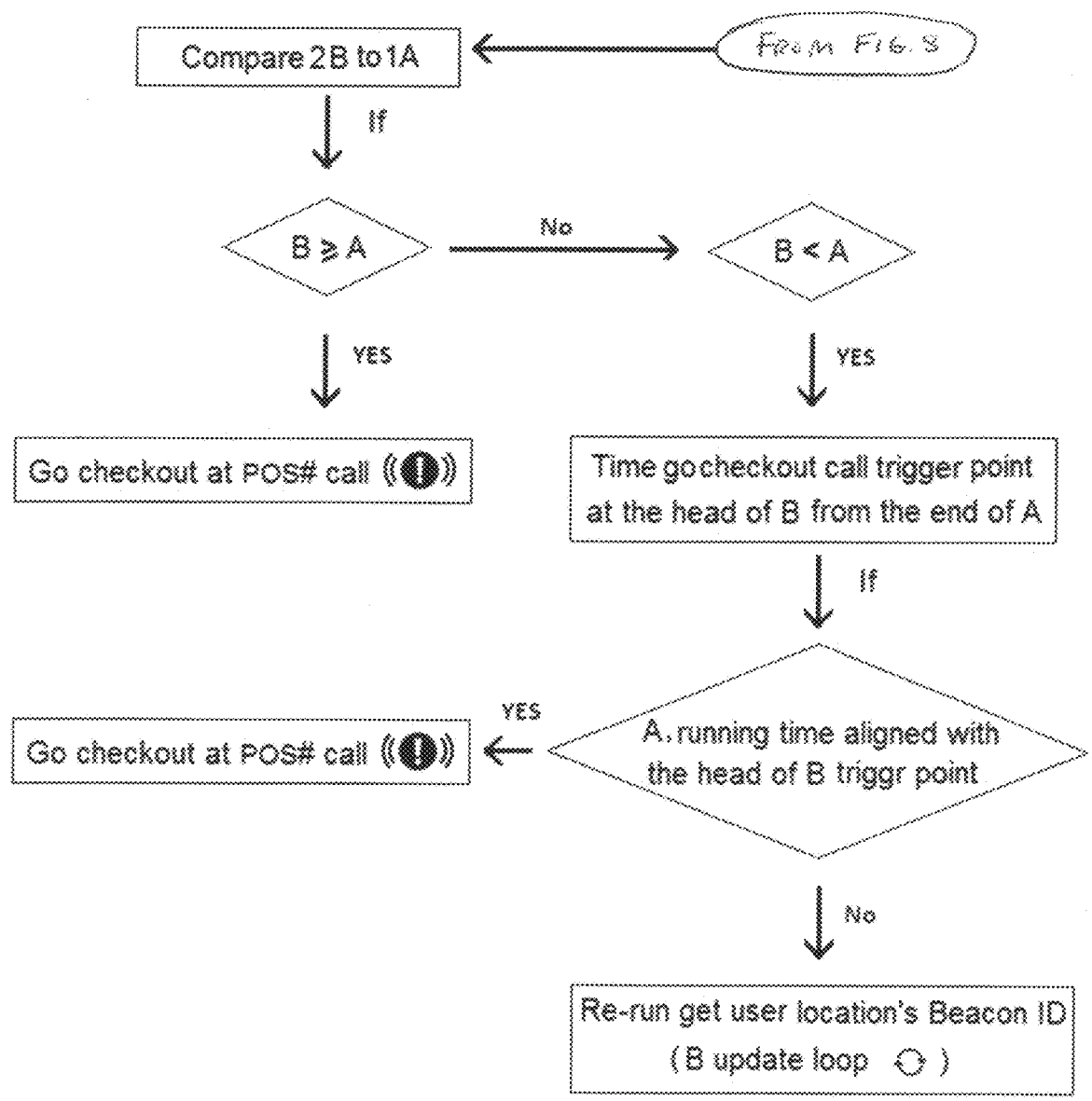

FIGS. 7A-7C depict detailed flow diagrams with steps that can be followed to determine virtual line turn ordering, line processing time quantification structure and the time values in it, structuring a virtual line with time values regarded to each user and backlogged according to the line's turn booking order to determine the turn units are issued to each user according to the user's order of booking, each turn unit is tagged with the user's id to personally reference all related data, there for every turn unit serve as a data containing unit that is orderly organized according to the virtual line's turn booking order and held within, a user id related relevant data to be available for the purpose of user identification reference, forecasted time values that relate to the user and the order of the line, have a time quantification for the process and any additional personalization indicators regarding users. The time values contained within the turn units comprise the expected overall user time value for processing of the user from the time of the go check out call to the end of the process. This user time value comprised of two time value elements represented in the diagram and referred to in several places in this document as "a" user duration time at point of sale and "b" user travel time to point of sale, these time values are provided and generated from the user behavior data base analysis combined with beacon indication user input and special event input.

Figure 8:
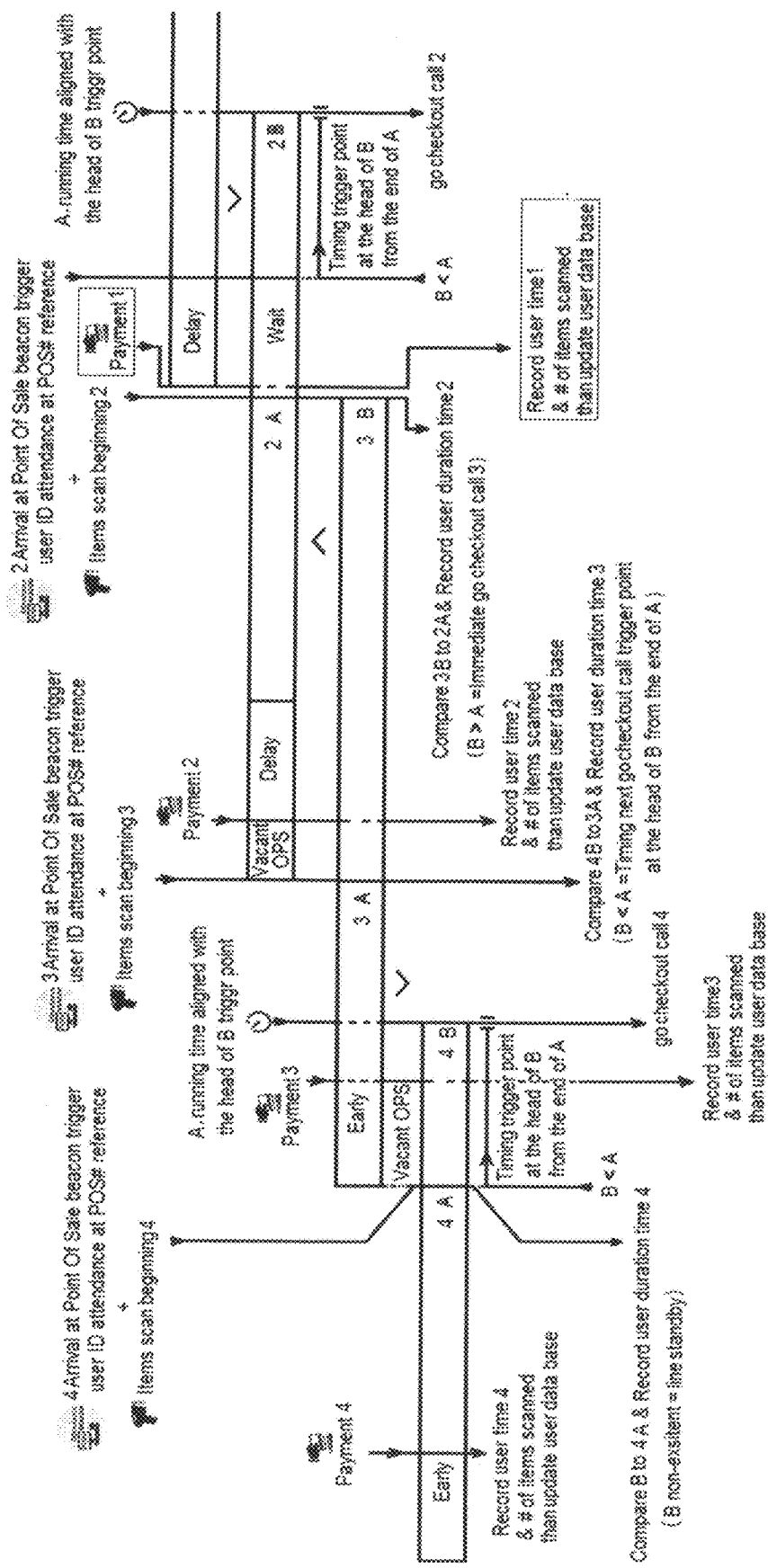
FIG. 8 illustrates a diagram comparing forecasted time values A&B of users between each other to optimize the processing line continuity flow of checking out user and capturing user's checkout behavioral data relevant to optimize the process, in accordance with features of the embodiments.

FIG. 8 presents a time line diagram describing the sequence of events triggered by the behavior of the users and received by the system's monitoring elements. This sequence of triggered events is designed for the purpose of optimizing the continuous flow of users through the checkout process by addressing the problems of check out continuity. The method approaches the problem by recognizing the user may exceed or shorten their check out process duration and that the user travel time to point of sale may take a longer or shorter time. Therefore we have fluctuation in this two categories, these categories are presented in the diagram as:

"A" the user's expected duration time of checkout, which is driven from the user duration forecast data analysis or the number of items time value user interface input.

And "B" the user's dynamic travel to designated point of sale which is indicated by the beacons layout and the analyzed data capture of actual user travel duration from the time of the "go check out call" until attendance at designated point of sale that generates a personal user average travel speed enabling a personalized optimization of expected user travel time.

Addressing these fluctuations of A and B is presented in the diagram by shifting the timing of the "go check out call" to a moment that the receiver of the go check out call will arrive to the designated point of sale at the most proximate time to the end of the checkout process of his predecessor in line, this timing optimization method compare between the current user's length of time value A (duration at point of sale) with the time value B (travel time to point of sale) of the following user on the virtual line.

In addition, the virtual line's structure and its timeline quantification method enable to conclude the time length of the entire line and monitor its progress rate. This line architecture concept can enable providing an expected wait time to the user with respect to its turn position in the line and the time values comprised within it. Additionally it enables users before booking in to the line a dynamic overview of the line's status update to their smart phones upon entering the geo-perimeter, thus letting the users assess whether they are ready to finish their shopping and book into the line with respect to the informed line's length, and in addition be updated with alerting notifications for the purpose of being reminded as to the line's progress and to their upcoming turn while already in the virtual line.

Also, the progress of the chronological turn units structure of the virtual line enables the triggering of various process based on the user's turn position, progress and beacon proximity. Referring to FIG. 8, a flow diagram 80 comparing forecasted time values A&B of users between each other to optimize the processing line continuity flow of checking out user and capturing user's checkout behavioral data relevant to optimize the process. The process begins at step 81.

Figure 9:
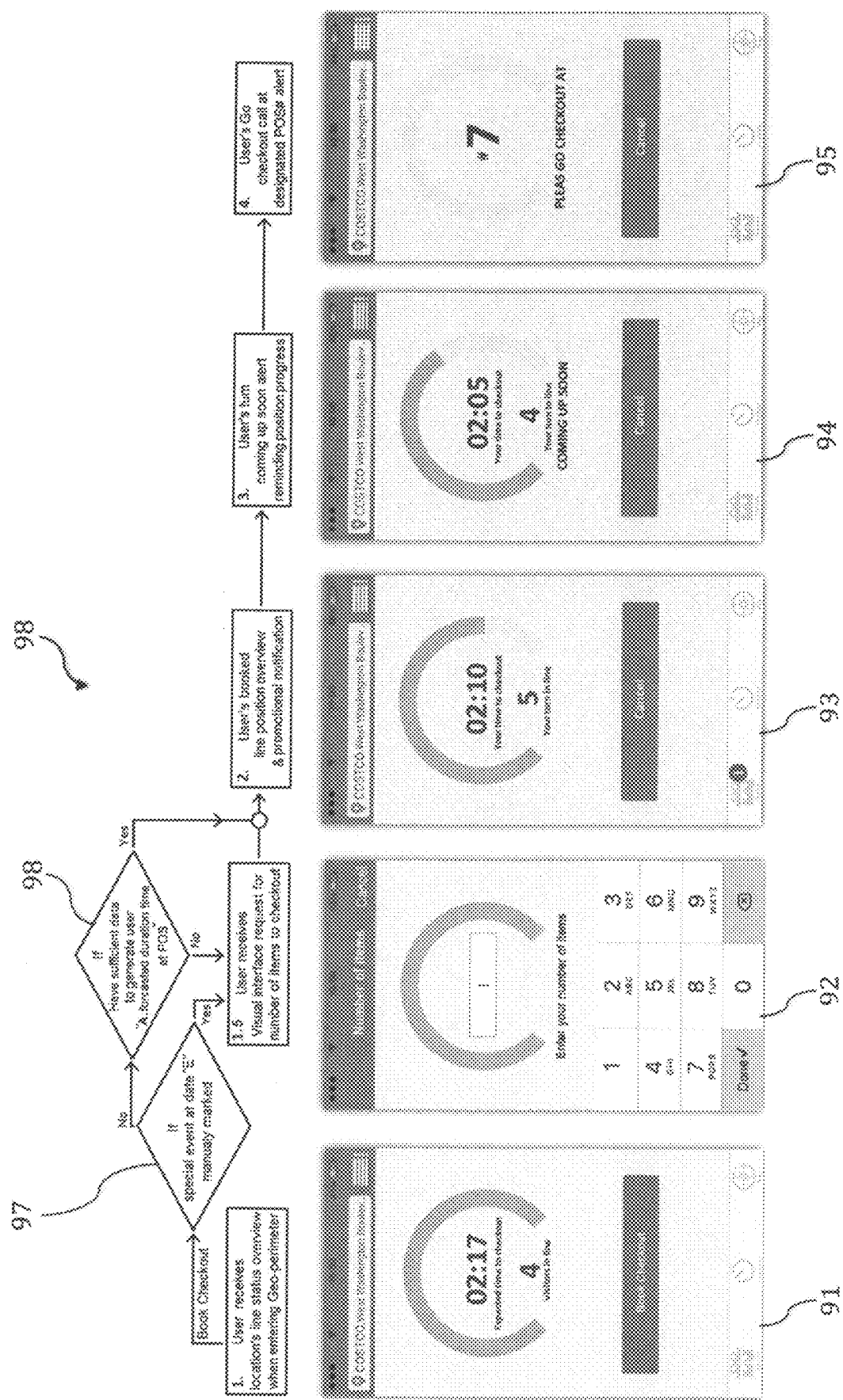
FIG. 9 illustrates a flow diagram and associated smartphone screenshots are shown, in accordance with features of the embodiments.

Referring to FIG. 9, a flow diagram 90 and associated smartphone screenshots are shown, in accordance with features of the embodiments. As shown in Block 1, a user receives location's line status overview 91 (shown on smartphone screen) when entering a Geo-perimeter. The user can Book Checkout on the smartphone interface. A decision 97 is then made whether a special event is manually marked. If yes, then the user receives Visual interface request for the number of items to checkout, as shown in Block 1.5. The number of items can be entered as shown in screensort 92. If not, then a second decision 98 is made wheather sufficient data exists to generate user "A. forcasted duration time at POS" message on the smartphone. If not, then again the user receives Visual interface request for the number of items to checkout again, as shown in Block 1.5; but if the answer is "yes" then the user's booked position overview and promotion notification is determined by the system as shown in Block 2, and is illustrated for the user in screenshot 93. In Block 3, a User's turn coming up soon alert can be provided to a user, as shown in screen shot 94, to remind the user of position progress (e.g., how much time is left to checkout and position in line). Finally, as shown in Block 4, a user is informed to go to a designated POS to checkout, which is again illustrated on the smartphone screen 95 (e.g. please go checkout at #7). Screenshot can be provided in the form of push notifications based on the user's turn, and virtual relevant information including but not limited to promotional info can also be provided on the smartphone screens when the user received line status information.

With respect to the user's location and beacon proximity and the surrounding context, this combination of timing with respect to the user's shopping stage and location based beacon proximity promotional and informative content offering, creates an ability to communicate a highly relevant contextual content that can serve the customers and the administrator of the system. In addition; Triggering condition "next up position", as presented in diagram 8, initiates the process of assigning the user with the least user's "A. duration time" loaded POS #.

The reason of this comparison is in order to sync the end of the two time values so the arrival of the upcoming user and the end of the checkout of the current user will occur as close as possible, this events alignment is possible by adjusting the timing call of "go check out" at a timing that the travel time value B, will end at optimal proximity to the end of duration time A, of the checkout process, thereby minimizing the time of ether the wait for evacuation upon arrival or vacancy gap at point of sale after the checkout process ended.

In addition the diagram includes the relationships between triggering events captured by monitoring the users behaviors via monitoring running code and or API on points of sale software and beacons indications.

All triggers represented in the diagram are utilized for measuring and recording user behavioral time with respect to the process of checking out and as triggers of a contextual particular user event for the purpose of activating checkout call timing optimization processes.

It is important to differentiate between a line-management system that is based upon appointments and a chronological line-management system that is based upon the dynamic advancement of the line itself. The latter systems may aim to ameliorate the burden of being physically present at the line in order to preserve place, by allowing the users to roam the premises. However, a major challenge besetting such goal is the ability to share the dynamic data with the users.

A server for the line administration, suitable software, beacon communication, and a system comprising user smartphones, and Internet communication of the user's devices with the server via the Internet, may all be required for such effective management of lines.

The present system provides an improvement over commercially available systems wherein they produced slips and a display of the progress of the line, that allowed the users some mobility but still required their maintaining eye contact with the display.

One or more of the following features can further characterize embodiments:

1. Monitoring the environment and the system's ability to "see" the status and behavior of the users in the site, e.g. store, by monitoring the beacons array and monitoring the activity of the POS device program. The purpose of the monitoring the indications is divided into two objectives: Collecting a behavior pattern and triggering a process:

1.1 Monitoring Indicators for Collecting Patterns of User Behavior to Improve Predictability of Personal Behavior A. Average User Speed Velocity is monitored from the time the "go checkout" message is read. At that time, the user is identified as located adjacent to a specific aisle beacon that represents a place in the store (origin) until the user reaches the Point of Sale Attendance Beacon (destination).

This ability is made possible when in advance with the walking distances between all the origin points and the destination points in the store, known at the moment the message is read ("go checkout at #7"), the POS 7 distance (Point Of Sale Attendance Beacon #7) from the starting point (Aisle beacon ID #123). The location of the user be determined at the time of reading, Therefore, the combination of the origin and the destination represents a predefined distance, the location of the user being performed by identifying user's presence adjacent the output beacon, the destination being determined by the system prioritizing POS device location according to the lowest expected waiting; this POS destination has a POS attendance beacon monitoring the arrival of the designated user at this POS device.

The user's movement duration can be deduced from the time elapsed between time of the call until the time of attendance, Point of Sale Attendance beacon #7. These two indications: The distance and duration of arrival allow the system to infer the velocity of the user.

Figure 3:
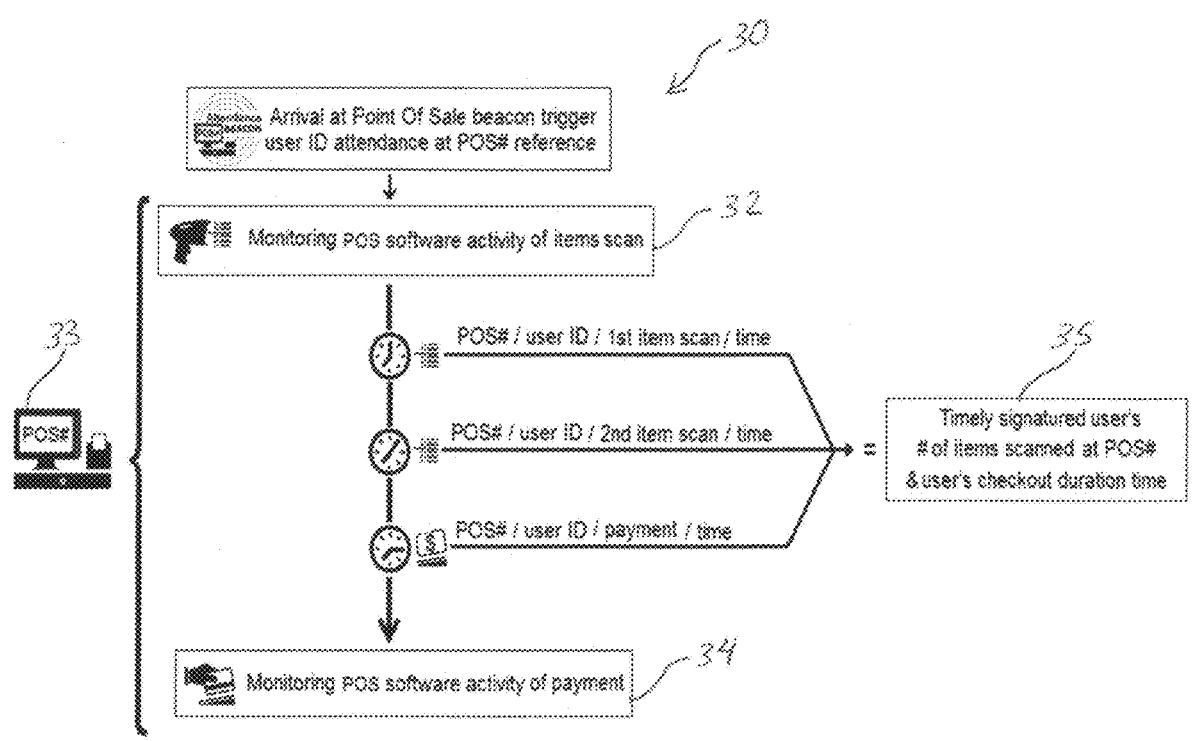
FIG. 3 illustrates a diagram illustrating a method of monitoring and capturing point of sale software activity data, in accordance with features of the embodiments.

The reader is referred to the process on the right side of FIG. 3.

B. Arrival Time Estimation.

When the aisle beacon displays a specific origin location in the store and Point of Sale Attendance beacon represents a specific POS device destination, the arrival time is collected from all users who went with that combination.

In this case, the estimated arrival times input in advance all combinations of points of origin and destinations in the store, improving accuracy of the prediction of the expected time of arrival in the combination of points, by collecting the time elapsed from the time the user is called (go checkout at #), standing next to an aisle beacon at an origin point, until time of reaching the destination of a POS beacon.

Multiple time samples collected from all users increase the accuracy of time-to-arrival data between the points in the store, and the multiplicity of these arrival times improves the expected arrival time for a combination of origin and destination. (Process on the left side of FIG. 3). In summary:

Option A is more personal and therefore requires a number of personal attendances, until allowing determination of the average personal velocity.

Option B refers to the combination of the origin point and the destination, with some including initial manual input of walking times between aisle beacon and POS beacon, to improve accuracy of estimate of arrival time of this combination from collection of all the users' data who walked between the same points.

The uniqueness of option B is allowing faster improvement of accuracy of arrival estimate due to using the data from a great number of users. However, the estimation ignores personal aberrations such as exceptionally slow walkers. The flexibility of selection of either of the two options allows for gradual adjustment when a new user is not familiar enough to the system to create a personal estimate of speed.

C. The Duration of a User's Attendance at the POS.

The duration can be monitored from the user's arrival at the designated POS adjacent to a dedicated POS beacon. This indication enables the user to measure the user's duration at the point and to cross-reference the duration with other information regarding user activity at the POS concomitant with product payment, to follow the process of scanning products, their number during this operation, and payment as an indication of the end of a process (represented in FIG. 2).

In addition, this information can be assigned to a specific user in a specific POS and can be stored database. Accessing the database and processing the data may afford a forecasting capability to estimate the user's future duration at the POS, for example by recognizing patterns assigned to a calendar, optionally assigned to dates (see FIG. 4). In addition, a future date may be manually marked in the calendar (see FIG. 7, on the right above) as event such as a holiday or a special sale. The special designation may allow the system to predict the duration of the stay of the user at the POS device and optionally send an alert to the user (FIG. 8, step 1.5) requesting the user to input the amount of goods that the user intends to purchase.

In this mode, the system will predict the duration of user's at the POS based on the history of processing of the same number of and may weigh the item's time, this data being collected from all users (FIG. 4 mark I). The flexibility of the system in forecasting either personal stay duration stay duration according to product weights the that is compatible with a start comes these the setting into consideration the represents versatility of the system to correctively respond to situations in which there is a high uncertainty in prediction according to familiarity with a user, erratic user's movement patterns over time and at special events, where sufficient information is not yet collected on a user for personal stay at POS projections or at special times.

1.2 Monitoring Indications as Trigger for a Process Dynamic User State

A. The Promotion of a Queue

Promotion (moving a user ahead in the queue) depends on the arrival of the user at the POS at the start of the product scan. The promotion of this queue is driven by indication of attendance of the user at the POS Attendance Beacon target concurrently and in cross-reference with an indication of scanning items that from monitoring the operation of the POS device.

This ability reflects a dynamic viewing of the user and enables the system to respond in accordance with this process, such as promoting the queue and updating the other users concerned. In addition, the combination of two indications drives process of a time for the "go checkout" alert for the next user. The alert time setting allows the next user to arrive as close as possible to the time of payment of the user present at the POS device.

This scheduling process is subject to a continuous update loop that takes next in line's user's distance from the designated POS using indications from the aisle beacons that notify the next user's dynamic origin.

For example, if the next user's arrival time is expected to be less than the expected time spent at the POS of the user present at the POS, the alert to the next user's device will be deferred to the end of the anticipated period of the present user's visit at the POS device, so that the time of arrival of payment coincide. This process into consideration that the comparison and checking of the duration of arrival at the destination is done continuously and can be changed according to the location of the next user. Concurrently the duration of the present user visit is updated (detailed in FIG. 6).

B. A User-Initiated Update of Queue Status

Update on the queue status at a specific site may be driven by alert to the system of a new user's arrival proximal to that site. The user's smartphone is essentially immediately exposed to each of the beacons identified with the alert allows system to send to the smartphone a relevant update on the size of the virtual queue at the site, thus helping the user to evaluate the appropriate time to order a place in the queue during stay in the site, right from the beginning of the buying stage.

This capability enables interactivity with the system: A user passes by the site e.g., store, and enters the beacons field and receives an update alert (FIG. 9, step 1) that is relevant to the store such as an offered discount, and decides to enter and simultaneously checks the status of the queue. the information relevant to store displayed from the moment of entering the beacons field of the store. The user can see that the general waiting time for the POS device is 5 minutes for example. He can then estimate that his order will need to be made 5 minutes from the POS itself. the end of his forecasted term in the store. In addition, if the user moves to another store, the system will identify this situation and update the relevant information in the new context. The system proactively updates the relevant information on the user's smartphone with updates after entering a new site.

2. Allocating Values to Two Time Components of the Queue: Staying at the POS and Arriving at the POS and Scheduling the Arrival Alert The separate allocation allows to coordinate the arrival time of the users to the POS on a continuous basis by overlaying the two time components, stay of the user at the POS and the arrival of the next users at the POS, expressed by timing the sending of an alert to arrive at the POS device so that both durations end at the same time.

3. Forecasts Based Upon Learning the Pattern of User Behavior.

The use of statistical tools to predict the user's stay at the POS and the duration of arrival enable a gradual improvement as the history of user behavior increases and allows for detection of user's movement patterns. The detection improves the prediction of the stay and arrival at POS.

4. Integration of System Components that Create Added Value

A. First, it can be important to discern between queue management systems based on appointment scheduling as an anchor for queuing, and chronological queue management systems based on the dynamic progress of the queue itself. One of challenges to date of systems such as latter, which are intended to release the user from the burden of waiting in the physical queue, is to nevertheless maintain continuity of the queue according to the dynamics of its progress. In particular, there is a user that the such as slips, electronic the and challenge to enable interaction and transmission of mobile information relating to the queue with the queuing users.

B. The system can include dedicated software on smart phones, beacons, software monitors operations of the POS devices, Internet or intranet communication with a server, and server comprising system management software.

The system resolves an unrecognized problem which apparently has no commercial solution, except for cumbersome systems that have a combination of physical number slips and a queue number display that requires the user to maintain eye contact therewith.

C. One limitation to progress in commercially available queue management systems is that they make use of dedicated hardware on the side, the use of or dedicated hardware for user interaction, together with fixed overhead screens. Thus so far no advanced and satisfying solution has been provided:

Desired aspects: The user's hardware can perform two-way data interaction with a server/computer that monitors and manages the queue.

Constraints: Dedicated hardware for user with sufficient capabilities requires high development, production, and maintenance costs that render the improvement impractical.

The application commercially implemented: Dedicated hardware for the user to wield, with low maintenance and but only basic capabilities involving slips very limited interaction with the user.

The smartphones are common today in the general population and are sophisticated hardware with the ability to monitor the queue environment and mobile data communications with the queue in the interaction between the queues to the management system. This situation is a recent development that enables use of the invention almost everywhere.

D. The capabilities of the smartphones and their widespread presence society enables the user and queue manager server, carried out in a portable manner and with the help of hardware that has sufficient capabilities on the user side, as well as suitable software installed thereunto.

Extant systems can be configured allow switching a queuing system that interacts with the user, for example by using a smart phone that can communicate with a queue manager server and collect data to update the queue status using the built-in features and sensors, as well as beacons to determine the exact location of the users and the POSs.

Accordingly, an interactive queue management system can be provided in accordance with the features described herein that can include at least one wireless beacon; and at least one server in communication with at least one point of sale via the at least one wireless beacon, the server being adaptable to enable smartphones to (a) receive point of sale data from the at least one wireless beacon; (b) determine a location of the smartphone relative to the at least one point of sale; and (c) pre-book checkout of a user of the smartphone at the at least one point of sale. Wireless beacons can be deployed throughout aisles in a store to track location of smartphones within the store. The wireless beacons can be deployed in association with the at least one point of sale to track location of smartphones at the at least one point of sale. The server can be configured to allow the smartphones to monitor progress of the at least one point of sale. The server can be configured to allow the smartphones to dwell a minimum time at or near the at least one point of sale upon notification of an advanced position at the at least one point of sale to complete a transaction.

An interactive queue management system can include at least one wireless beacon deployed near aisles throughout a store and adapted to track location of the smartphones within the store, at least one wireless beacon located at a point of sale and adapted to track arrival of the smartphones at the point of sale, and at least one server in communication with the point of sale via the at least one wireless beacon and adapted to communicate with the smartphones and enable the smartphones to: (a) receive point of sale activity data; (b) determine their location relative to the point of sale; and (c) pre-book checkout at the point of sale. The server can be configured to allow the smartphones to monitor point of sale progress, allow the smartphones and to dwell a minimum time at or near the at least one queue upon notification of an advanced position at the point of sale to complete a transaction.

Furthermore, a method for providing interactive queue management within a store can be provided that includes providing wireless communication beacons deployed throughout a store, providing a server adapted to monitor software activity of points of sale within a store and to determine their status, and to monitor location of smartphones near the wireless communication beacons deployed throughout a store, recording data about the status and the location in a database and periodically updating the data, receiving from a smartphone used by a customer of the store an indication that the customer requests to enter a virtual line for a point of sale, notifying the smartphone via a push notification message about the total number of customers in the virtual line, and the customer's turn position in the virtual line, further notifying the smartphone via push notification messages about updated progress in the virtual line, and adjusted wait time expected for the customer's turn to check out at a point of sale, and informing the smartphone via push notification message about which point of sale to go to check out. The messages about updated progress can include the customer's turn for arrival with respect to an assigned point of sale with the lowest duration time load at present. The message about which point of sale to go to to check out can include the point of sale's location or number sign. The software activity can include a time signature indication representing the contextual time of event at the point of sale, and can include recurring frequency rates and statistics of events. The software activity can include a measurement of time between activity indications from the point of sale software to determine recurring frequency rates and statistics of events. The software activity can include measuring time between activity indications from the point of sale software to determine at least one of patterns and statistics. The software activity can include monitoring the point of sale for a number of customers in a virtual queue waiting to checkout and for an estimated time spent checking each customer out.

The server can be further configured to receive an indication that a smartphone has entered a geo-fenced location defined within the store based on communications of the smartphone with at least one wireless beacon and should be monitored. The server can be further configured to forecast user expected duration time at a point of sale based on at least one of: point of sale activity, smartphone location, and smartphone user activity history. Collected data in the server can be from timely signatured activity indications determined from monitoring the point of sale software activity and or duration time captured by a designated point of sale user attendance beacon.

The server can associate specific users with related data indications from monitoring point of sale software activity by cross referenced user ID indication from designated point of sale user attendance beacon. The server can forecast user expected travel time to the assigned checkout station based on collected data from the customer's smart phone location by the beacons layout indicating the dynamic distance and travel time of the user from the designated point of sale.

The embodiments utilize smartphones mobility for the purpose of line waiting allocation by unbinding waiting lines from the stationary constraint of physical presence of their turn watching and line entering only at the moment of physical arrival presence attendance. The embodiments enable users to move freely while at the same time be in line and receive informing messages regarding their line position progress and time of turn arrival via smartphones.

The system and methods provide "smart place holders". These placeholders are virtually located in the vicinity of a POS and are configured to allow a user employing the placeholder to roam while maintaining a place in a queue of the POS. The user's device can be the placeholder. The device can monitor devices of other users, located in the queue and optionally proximal to the queue. The system can include relevant user data contained in the turn units and can include indicators for personalized user experience, allowing line process management optimization, including but not limited to forecasting time values of users. The method can further include a step of comparing forecasted time values of users between each other to determine the timing of the "go checkout call" moment for optimizing the processing continuity line flow of checking out users. The embodiments can includes capturing user's checkout behavioral data for optimizing the processing continuity line flow of checking out users.

The invention claimed is:

1. An interactive queue management system, comprising:
wireless beacons deployed throughout aisles in a store to track location of smartphones within the store and deployed in association with the at least one point of sale to track location of smartphones at the at least one point of sale; and
at least one server in communication with at least one point of sale via at least one wireless beacon among the beacons, said at least one server configured to enable smartphones to:
(a) receive point of sale data from the at least one wireless beacon;
(b) determine a location of the smartphone relative to the at least one point of sale;
(c) pre-book checkout of a user of the smartphone at the at least one point of sale;
(d) allow the smartphones to monitor progress of the at least one point of sale; and
(e) allow the smartphones to dwell a minimum time at or near the at least one point of sale upon notification of an advanced position at the at least one point of sale to complete a transaction;
wherein the at least one server is further configured to forecast user expected duration time at the at least one point of sale based on at least one of: point of sale activity, smartphone location, and smartphone user activity history; and
wherein the at least one server is further configured to analyze point of sale data to determine attributes including user duration at the at least one point of sale, item scan rate, and item processing time values.

2. An interactive queue management system, comprising:
wireless beacons deployed near aisles throughout a store and adapted to track location of smartphones within the store;
at least one wireless beacon among the wireless beacons, wherein the at least one wireless beacon is located at at least one point of sale and adapted to track arrival of the smartphones at the at least one point of sale; and
at least one server in communication with the at least one point of sale via the at least one wireless beacon and configured to communicate with the smartphones and enable the smartphones to:
(a) receive point of sale activity data;
(b) determine their location relative to the at least one point of sale;
(c) pre-book checkout at the at least one point of sale;
(d) allow the smartphones to monitor progress of the at least one point of sale; and
(e) allow the smartphones to dwell a minimum time at or near the at least one point of sale upon notification of an advanced position at the at least one point of sale to complete a transaction;
wherein the at least one server is further configured to forecast user expected duration time at the least one point of sale based on at least one of: point of sale activity, smartphone location, and smartphone user activity history; and wherein the at least one server is configured to provide a message to a smartphone user identifying the at least one point of sale to go to and check out from including providing an identity of a location of the at least one point of sale or a number sign associated with the at least one point of sale.

3. A method for providing interactive queue management within a store, comprising:

providing wireless communication beacons deployed throughout a store;

providing a server configured to monitor software activity of points of sale within a store and to determine their status, and to monitor location of smartphones near the wireless communication beacons deployed throughout a store;

recording data about the status and the location in a database and periodically updating the data;

receiving from a smartphone used by a customer of the store an indication that the customer requests to enter a virtual line for a point of sale;

notifying the smartphone via a push notification message about the total number of customers in the virtual line, and the customer's turn position in the virtual line;

further notifying the smartphone via push notification messages about updated progress in the virtual line, and adjusted wait time expected for the customer's turn to check out at a point of sale; and informing the smartphone via push notification message about which point of sale to go to check out from;

wherein the server is further configured to forecast user expected duration time at a point of sale based on at least one of: point of sale activity, smartphone location, and smartphone user activity history.

4. The method of claim 3, wherein the messages about updated progress include the customer's turn for arrival with respect to an assigned point of sale with the lowest duration time load at present.

5. The method of claim 3, wherein the message about which point of sale to go to check out from includes the point of sale's location or number sign.

6. The method of claim 3, wherein the software activity includes a time signature indication representing the contextual time of event at the point of sale.

7. The method of claim 3, wherein the software activity includes recurring frequency rates and statistics of events.

8. The method of claim 3, wherein the software activity includes a measurement of time between activity indications from the point of sale software to determine recurring frequency rates and statistics of events.

9. The method of claim 3, wherein the software activity includes measuring time between activity indications from the point of sale software to determine at least one of patterns and statistics.

10. The method of claim 3, wherein the software activity includes monitoring the point of sale for a number of customers in a virtual queue waiting to checkout and for an estimated time spent checking each customer out.

11. The method of claim 3, wherein the server is further configured to receive an indication that a smartphone has entered a geo-fenced location defined within the store based on communications of the smartphone with at least one wireless beacon.

12. The system of claim 1, further comprising said at least one server configured to provide a message to a smartphone user identifying the at least one point of sale to go to and check out from including providing an identity of the location of the at least point of sale or a number sign associated with the at least one point of sale.

13. The system of claim 1, further comprising said at least one server configured to provide a message to a smartphone user about at least one of: a total number of customers in a virtual line, the customer's turn position in the virtual line, updated progress in the virtual line, and adjusted wait time expected for the customer's turn to check out at the at least one point of sale.

14. The system of claim 2, further comprising said at least one server configured to analyze point of sale data to determine attributes including user duration at the at least one point of sale, item scan rate, and item processing time values.

15. The system of claim 2, further comprising said at least one server configured to provide a message to a smartphone user about at least one of: a total number of customers in a virtual line, the customer's turn position in the virtual line, updated progress in the virtual line, and adjusted wait time expected for the customer's turn to check out at the at least one point of sale.

* * * * *